R. CRISWELL, Jr.
Cultivator.

No. 5,755.  Patented Sept. 5, 1848.

UNITED STATES PATENT OFFICE.

ROBERT CRISWELL, JR., OF CHAMBERSBURG, PENNSYLVANIA.

IMPROVEMENT IN CULTIVATOR-POINTS.

Specification forming part of Letters Patent No. 5,755, dated September 5, 1848.

*To all whom it may concern:*

Be it known that I, ROBERT CRISWELL, Jr., of Chambersburg, in the county of Franklin and State of Pennsylvania, have invented a new and Improved Cultivator-Point; and I do hereby declare the following to be a full, clear, and exact description thereof, reference being had to the accompanying drawings, making a part of this specification, in which—

Figure 2:
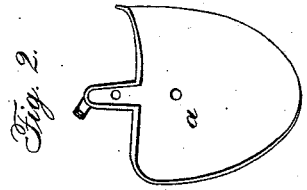
Figure 1:
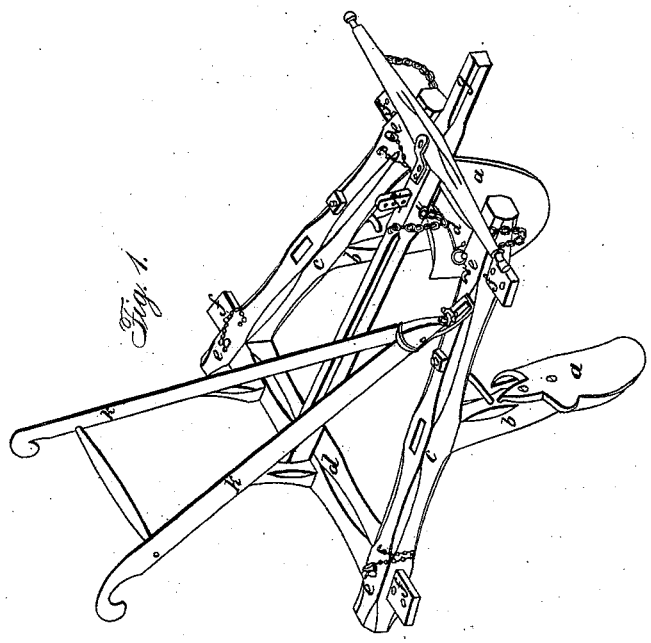

Figure 1 is a perspective view of a cultivator having my improved form of cultivating-point, and Fig. 2 an enlarged perspective view of the point detached.

The nature of my invention consists in giving such a curve to the sides of what is known as the "shovel-shaped cultivator-point" as to enable it to serve the same purpose as the plow shaped cultivator-point. One side of the shovel is curved forward, and the other side has a similar curve toward the rear, as represented in the drawings. As the cultivator advances the forward edge of the shovels cleaves the earth and their rear curved edge throws the earth against the corn, thus stirring the earth as thoroughly and cultivating as effectually as the point and mold-board corn plow or cultivator, at the same time being much lighter and much less expensive. The cultivator known as the "scraper-cultivator" agitates the surface of the earth merely, leaving the remainder of the soil hard and stiff, which will not be the case with my improved cultivating curved shovels, as will readily be perceived, as their points may be made to penetrate the earth to any necessary and required depth. I place my improved shovel cultivator-points in a suitable frame, arranged in such a manner as to cultivate both sides of a row at the same time, or for both to pass between two rows, throwing the earth outwardly against each.

In the accompanying drawings, Fig. 1 represents a cultivator-frame arranged in such a manner as to pass over the tops of the corn, and the shovel-points so arranged as to cultivate both sides of a row at the same time.

$a\ a$ are the cultivating shovel-points. $b\ b$ are the standards to which they are secured. $c\ c$ are the side pieces of the cultivator-frame, to which the standards $b\ b$ are secured; and $d\ d$ are the transverse end pieces of the frame. The side pieces, $c\ c$, are secured to the end pieces, $d\ d$, as follows: Long tenons $f\ f$ are formed on each end of the transverse pieces $d\ d$, which pass through mortises in each end of the side pieces, $c\ c$, and are secured within the same by the pins $e\ e$. By means of a series of apertures in each of the tenons $f\ f$ for the reception of the pins $e\ e$ the side pieces, $c\ c$, and cultivating-points can be brought nearer to or removed farther from each other; also, by drawing in the front ends of the side pieces and separating their rear ends, or vice versa, a greater or less obliquity of position can be given to the cultivating shovel-points.

The tongue or beam $g$ of the cultivator is secured by a hinge-joint at its rear end to the rear transverse piece, $d$, and to a curved gage-pin, $h$, rising from the center of the front transverse pin, $d'$, by means of the pin $i$, by which arrangement the front end of the beam can be raised or lowered, and thereby the depth of the furrow formed by the cultivating shovel-points adjusted and regulated.

What I claim as my invention, and desire to secure by Letters Patent, is—

The giving the sides of a cultivating shovel-point, the one a forward and the other a rearward curve, substantially for the purpose herein set forth, and of the form represented in the accompanying drawings.

ROBT. CRISWELL, JR.

Witnesses:
Z. C. ROBBINS,
GUY C. HUMPHRIES.